United States Patent [19]
Campagnolo

[11] Patent Number: 5,864,951
[45] Date of Patent: Feb. 2, 1999

[54] METHOD FOR MOUNTING A FREE WHEEL ASSEMBLY ON HUB OF A BICYCLE REAR WHEEL

[75] Inventor: Valentino Campagnolo, Vicenza, Italy

[73] Assignee: Campagnolo S.r.l., Vicenza, Italy

[21] Appl. No.: 742,125

[22] Filed: Oct. 31, 1996

[30]       Foreign Application Priority Data

Dec. 29, 1995  [IT]  Italy ............................. TO95A001059

[51] Int. Cl.$^6$ .................................................. B25B 27/00
[52] U.S. Cl. ................................ 29/894; 29/270; 29/284; 192/64

[58] Field of Search ............................. 29/894, 270, 284; 192/64

Primary Examiner—P. W. Echols
Attorney, Agent, or Firm—Sughrue, Mion, Zinn, Macpeak & Seas, PLLC

[57]               ABSTRACT

A free wheel body is inserted within the hub of a bicycle rear wheel while the pawls of the free wheel are temporarily held in their retracted positions by an auxiliary tool facilitating the mounting operation. The tool is constituted by a bush having a plurality of longitudinal wings which are elastically deformable. When the mounting operation has been carried out, the bush can be removed from body of the free wheel by making it slide rearwardly thereon.

1 Claim, 1 Drawing Sheet

METHOD FOR MOUNTING A FREE WHEEL ASSEMBLY ON HUB OF A BICYCLE REAR WHEEL

BACKGROUND OF THE INVENTION

The present invention relates to a method and a device for mounting a free wheel assembly on the hub of a bicycle rear wheel, said free wheel assembly including a free wheel body having an end portion carrying one or more pawls distributed on the outer periphery thereof, and for engaging an annular crown with inner teeth carried by one end of the hub, each pawl being biased by respective spring means towards a position projecting out of the profile of the free wheel body.

The Applicant has been manufacturing and selling a free wheel assembly of the above indicated type for some time, which is provided with an auxiliary tool for facilitating the mounting operation, which is constituted by a metal wire bent so as to form an open ring with two handling arms which project radially from the adjacent ends of the open ring. If the user has dismantled the free wheel from the rear hub of the bicycle and has to mount it again, or has to mount a new free wheel, the above-mentioned auxiliary tool greatly facilitates the mounting operation. In fact, the open ring is enlarged elastically by acting on said end arms and is then placed around the end portion of the free wheel body from which the pawls project, so that these pawls are temporarily held, against the action of the respective spring means, in positions retracted within the free wheel body, so that the latter can be axially engaged within said annular crown with inner teeth of the bicycle hub. As soon as the end portion of the free wheel body carrying the pawls has partially engaged said annular crown, the auxiliary tool can be removed, by enlarging again the opened ring and disengaging the ring from the free wheel body, while the pawls are held in the respective retracted positions by the engagement thereof with the teeth of said annular toothed crown. Once the auxiliary tool has been removed, the mounting can be completed by axially pushing the free wheel body within the annular toothed crown of the hub until the final mounting position is reached.

Studies and tests conducted by the Applicant in the field of bicycle wheels and particularly with regard to the connection of wheel spokes to the hub have however led to devise new hub configurations (which have formed the subject of previous patent applications of the same Applicant) in which said annular crown with inner teeth is in a position relatively displaced inwardly within the hub, with respect to the end surface of the latter. As a result of this, the above described auxiliary tool can not be used for mounting the free wheel, since when the free wheel assembly, with the auxiliary tool mounted thereon holding the pawls in retracted position, is inserted within the end of the hub, the interference of the auxiliary tool with the end surface of the hub prevents further axial movement of the free wheel body within the hub and blocks the pawls from entering the toothed crown and engage therewithin.

SUMMARY OF THE INVENTION

The object of the present invention is that of overcoming this drawback.

In order to achieve this object, the invention provides a method for mounting a free wheel assembly of the above described type on the hub of a bicycle rear wheel, in which an auxiliary device is provided for facilitating mounting of the free wheel, which is able to temporarily hold the pawls in their retracted position until they engage within said annular toothed crown, characterized in that said auxiliary device is constituted by a bush having a plurality of longitudinal elastically deflectable wings, which in their free condition define an end portion of the bush with a tapered configuration, and in that said bush is mounted over the free wheel body, so that said elastically deflectable wings hold the pawls in their retracted positions, and the end portion of the free wheel body is inserted within the hub with said bush mounted thereon until the pawls are engaged within said annular crown, said bush being then removed from the free wheel body by making it to slide rearwardly thereon.

Due to the particular structure of the above described device, the free wheel body, with the bush mounted thereon, can penetrate within the hub over a relatively long distance, until engagement of the pawls within the toothed crown is obtained, since there is no interference between said bush which is used as mounting facilitating tool, and the front end surface of the hub. The flexibility of the longitudinal wings of the bush serves on one hand to elastically hold the pawls in their retracted positions, and on the other hand enables the wings of the bush to be flexed outwardly from removing the bush rearwardly from the free wheel body after that the latter has been mounted within the hub.

According to a further preferred feature, said bush has at one rear end thereof, opposite to the front end having said longitudinal wings, an annular flange which makes it easier for the user to hold the tool, particularly when the bush must be removed rearwardly from the free wheel body.

The invention naturally provides not only the method for mounting, but also and particularly said bush-like auxiliary tool which is used in the mounting operation.

BRIEF DESCRIPTION OF THE DRAWINGS

Further features and advantages of the invention will become apparent from the description which follows with reference to the annexed drawings, given purely by way of non-limiting example, in which.

DETAILED DESCRIPTION OF THE INVENTION

Figure 1:
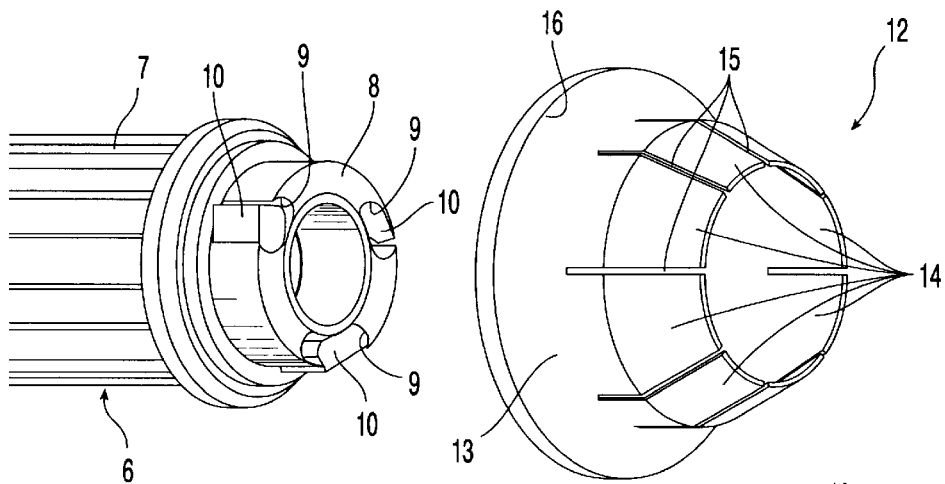
FIG. 1 is an exploded perspective view of the end portion of the free wheel body and the mounting auxiliary tool according to the present invention.

In the drawings, reference numeral 1 designates the hub of a bicycle rear wheel, comprising a tubular body ending with an axial end flange 2 to which the spokes 3 of the bicycle rear wheel are anchored. This arrangement is different from the conventional arrangement, in which the end portion of the hub has a radial flange and the spokes have elbow-like bent end portions which engage through holes formed in said radial flange. The Applicant has already filed patent applications with reference to this arrangement and in particular to the way by which the spokes are connected to the hub. These details of construction are not illustrated herein since they do not fall, taken alone, within the scope of the present invention. The only importance of these details for the purposes of the present description is that, as a result of the above-mentioned configuration, the conventional annular crown 4, with inner teeth 5, which is provided inside the hub 1 for engagement of the pawls of the bicycle free wheel, is more spaced inwardly within the hub with respect to the front end surface 1a of hub 1, compared with the conventional solutions.

Reference numeral 6 generally designates a bicycle free wheel, of a type known per se, comprising a body 7 which is for receiving thereon the sprockets for engagement of the bicycle chain, with an end portion 8, of reduced diameter, having a plurality of seats 9 within which there are received pawls 10 which are each biased towards a position projecting out of the profile of the end portion 8 of the freewheel 6 (FIG. 1) by a respective spring 11 (FIG. 2) interposed between the pawl 10 and the wall of the seat 9.

When the user has to dismantle the free wheel 6 from hub 1 and must then mount the free wheel again, or replace it with a new free wheel, this mounting operation is difficult, since the end portion 8 of the body 7 of the free wheel must be inserted within the annular crown 4 of hub 1. It is therefore necessary to hold the pawls 10 in their retracted positions in order to put the end portion 8 within the annular crown 4.

According to the invention, this is obtained easily and rapidly with the help of a mounting auxiliary tool constituted by a bush 12, which in the illustrated example is made of plastic material, comprising a cylindrical wall 13 which at its front end has a plurality of longitudinal wings 14 which are elastically deflectable, defined by longitudinal slots 15 formed in the body of plastic material of bush 12. In the undeformed condition shown in FIG. 1, wings 14 define an end portion of bush 12 having a conical configuration. At its rear end, opposite to wings 14, bush 13 has instead a radial flange 16 which has the purpose of making it easier for the user to hold the bush.

Figure 2:
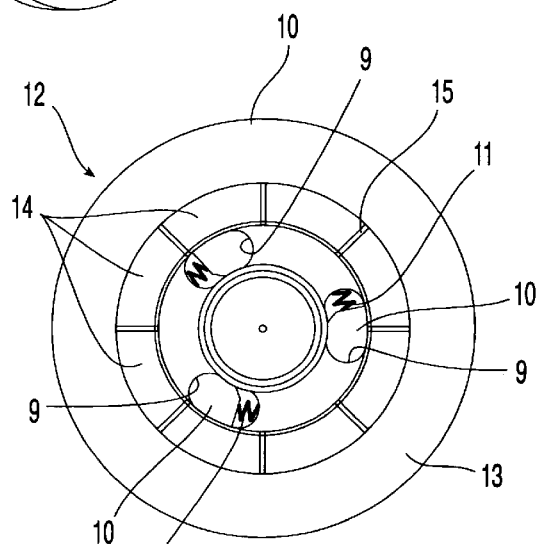
FIG. 2 is a front view of the end portion of the free wheel body which is shown in FIG. 1, with the auxiliary tool mounted thereon.
Figure 3:
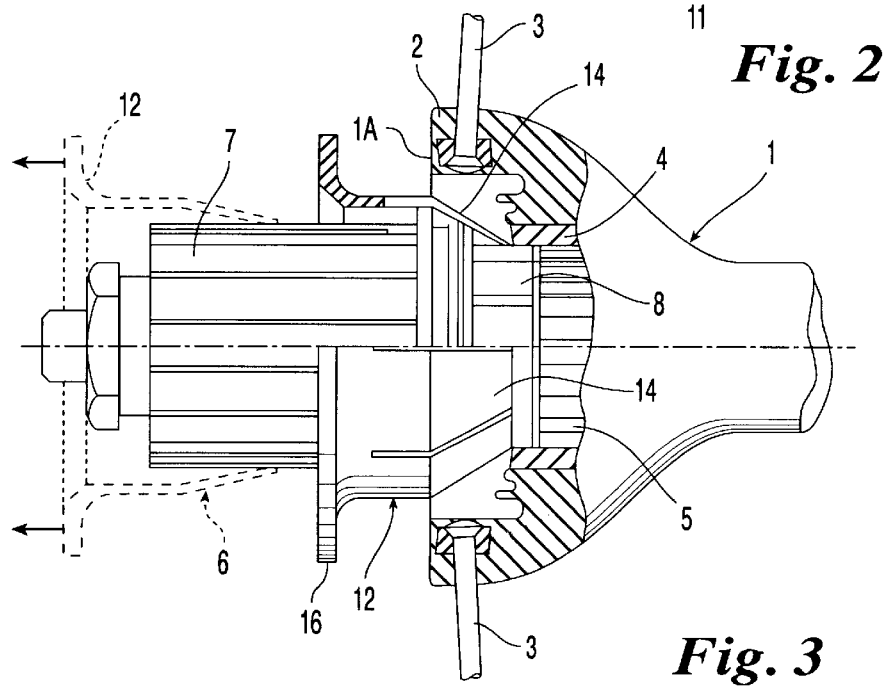
FIG. 3 is an axial cross-sectional view of one end portion of a hub of a bicycle rear wheel, with the free wheel assembly and the associated mounting auxiliary tool, in an intermediate condition of the mounting process.

As shown in FIG. 3, before mounting body 7 of the free wheel within hub 1, bush 12 is mounted over the front end of body 7 (as shown in FIG. 2 and by undotted lines in FIG. 3) so that the wings 14 elastically hold pawls 10 in their retracted positions, against the action of the return springs 11 (FIG. 2). In this condition, the free wheel assembly can be easily mounted within hub 1, by inserting the end portion 8 of body 7 within the toothed crown 4. This result can be obtained also if the toothed crown is located much inwardly within the body of hub 1 with respect to the front surface la, since bush 12 does not interfere with the front surface of the hub. When part 8 is at least partially inserted within the toothed crown 4, the bush 12 can be removed, since partial engagement of the pawls 10 within the toothed crown 4 is sufficient to prevent the return of pawls 10 to their projecting positions. In this condition (shown with undotted lines in FIG. 3) bush 12 can therefore be removed, and this is done by making the bush slide rearwardly on body 7 of the free wheel 6 (position shown with dotted lines in FIG. 6). During this phase, the radial flange 16 of bush 12 makes it easier for the user to hold the bush.

From the foregoing description, it is clearly apparent that the invention enables the free wheel assembly to be mounted on the hub of the bicycle rear wheel with simple, easy and rapid operations and making use of simple and unexpensive means.

Naturally, while the principle of the invention remains the same, the details of construction and the embodiments may widely vary with respect to what has been described and illustrated purely by way of example, without departing from the scope of the present invention.

What is claimed is:

1. Method for mounting a free wheel assembly on the hub of a bicycle rear wheel, said free wheel assembly including a free wheel body having an end portion carrying one or more pawls distributed throughout the outer periphery thereof, and for engaging an annular crown with inner teeth carried by the hub, and each pawl being biased by respective spring means towards a position projecting out of the free wheel body, providing an auxiliary tool for temporarily holding the pawls in retracted positions until the end portion of the free wheel is engaged within said annular crown, wherein said auxiliary tool is constituted by a bush having a plurality of longitudinal wings which are elastically deformable, and in their free condition constitute an end portion of the bush with a tapered configuration, said method comprising mounting said auxiliary tool on the free wheel body, with said elastically deformable wings holding the pawls in their retracted positions, inserting the free wheel assembly with the bush mounted thereon within the hub until said end portion of the free wheel body is at least partially engaged within said annular crown, and removing said bush from the free wheel body by sliding the bush rearwardly thereon.

* * * * *